US010217228B2

United States Patent
Suk et al.

(10) Patent No.: US 10,217,228 B2
(45) Date of Patent: Feb. 26, 2019

(54) METHOD, SYSTEM AND NON-TRANSITORY COMPUTER-READABLE RECORDING MEDIUM FOR MEASURING BALL SPIN

(71) Applicant: CREATZ Inc., Gyeonggi-do (KR)

(72) Inventors: Yong Ho Suk, Gyeonggi-do (KR); Jey Ho Suk, Seoul (KR)

(73) Assignee: CREATZ, INC., Gyeonggi-Do (KR)

( * ) Notice: Subject to any disclaimer, the term of this patent is extended or adjusted under 35 U.S.C. 154(b) by 14 days.

(21) Appl. No.: 15/637,408

(22) Filed: Jun. 29, 2017

(65) Prior Publication Data
US 2018/0005385 A1    Jan. 4, 2018

(30) Foreign Application Priority Data
Jun. 29, 2016  (KR) .................... 10-2016-0081878

(51) Int. Cl.
| | |
|---|---|
| *G06T 7/00* | (2017.01) |
| *G06T 7/246* | (2017.01) |
| *G06T 7/35* | (2017.01) |
| *A63B 69/36* | (2006.01) |
| *G01C 11/02* | (2006.01) |

(52) U.S. Cl.
CPC .......... *G06T 7/248* (2017.01); *A63B 69/3661* (2013.01); *G01C 11/02* (2013.01); *G06T 7/35* (2017.01); *G06T 2207/30224* (2013.01)

(58) Field of Classification Search
CPC . G06T 7/248; G06T 7/35; G06T 2207/30224; A63B 69/3661; G01C 11/02

USPC ......................................................... 382/274
See application file for complete search history.

(56) References Cited

U.S. PATENT DOCUMENTS

| | | | |
|---|---|---|---|
| 2017/0200277 A1* | 7/2017 | Keat ...................... | G06T 7/248 |
| 2018/0174308 A1* | 6/2018 | Ijiri ....................... | A63B 69/00 |

FOREIGN PATENT DOCUMENTS

KR    10-2009-0112538 A    10/2009

* cited by examiner

*Primary Examiner* — Ping Y Hsieh
(74) *Attorney, Agent, or Firm* — Dinsmore & Shohl LLP; Yongsok Choi, Esq.

(57) ABSTRACT

The present invention relates to a method, system and non-transitory computer-readable recording medium for measuring ball spin. According to one aspect of the invention, there is provided a method for measuring ball spin, comprising the steps of: detecting at least one mark appearing in a region corresponding to a ball in each of a plurality of images in which the ball is photographed, wherein a physical quantity of the ball is to be measured; recognizing a mark commonly detected over a first image and a second image that are temporally adjacent, with reference to information on properties of the at least one detected mark in each of the plurality of images, and generating a mark sequence including information on the properties of the recognized mark in the first and second images; and measuring a physical quantity related to spin of the ball with reference to the generated mark sequence.

16 Claims, 8 Drawing Sheets

METHOD, SYSTEM AND NON-TRANSITORY COMPUTER-READABLE RECORDING MEDIUM FOR MEASURING BALL SPIN

CROSS-REFERENCE TO RELATED APPLICATIONS

This application claims priority to Korean Patent Application No. 10-2016-0081878 filed on Jun. 29, 2016, the entire contents of which are hereby incorporated by reference.

FIELD OF THE INVENTION

The present invention relates to a method, system and non-transitory computer-readable recording medium for measuring ball spin.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen. In the virtual golf systems, it is important to acquire the photographed images of the golf ball as good as possible.

In this connection, a technique for photographing a golf training session while adjusting the location or color of illumination to acquire more diverse images of a golf ball has been disclosed in Korean Laid-open Patent Publication No. 10-2009-0112538 (entitled, "APPARATUS FOR OBTAINING GOLF IMAGES USING ILLUMINATION CONTROL, AND GOLF PRACTICE SYSTEM BASED ON IMAGE PROCESSING USING IT"), the contents of which are incorporated herein by reference in its entirety. However, various conventional techniques including the above one have not been concerned with a technique required to acquire golf ball images in a good state, which is necessary in accurately measuring a physical quantity of a golf ball, or a technique for measuring physical quantities of a golf ball using a mark sequence obtainable from a plurality of golf ball images.

Therefore, the inventor(s) present a novel technique for accurately measuring physical quantities of a golf ball by analyzing a mark sequence appearing in golf ball images obtained from a high-speed camera capable of photographing many frames of images for a short time.

SUMMARY OF THE INVENTION

One object of the present invention is to analyze a mark sequence appearing over a plurality of images in which a moving golf ball is photographed to measure a spin rate and a spin direction of the golf ball.

Another object of the invention is to compensate errors that may occur as an angle of view at which a camera photographing a moving golf ball views the golf ball varies with the movement of the golf ball.

The representative configurations of the invention to achieve the above objects are described below.

According to one aspect of the invention, there is provided a method for measuring ball spin, comprising the steps of: detecting at least one mark appearing in a region corresponding to a ball in each of a plurality of images in which the ball is photographed, wherein a physical quantity of the ball is to be measured; recognizing a mark commonly detected over a first image and a second image that are temporally adjacent, with reference to information on properties of the at least one detected mark in each of the plurality of images, and generating a mark sequence including information on the properties of the recognized mark in the first and second images; and measuring a physical quantity related to spin of the ball with reference to the generated mark sequence.

According to another aspect of the invention, there is provided a system for measuring ball spin, comprising: a mark sequence management unit configured to detect at least one mark appearing in a region corresponding to a ball in each of a plurality of images in which the ball is photographed, wherein a physical quantity of the ball is to be measured, and recognize a mark commonly detected over a first image and a second image that are temporally adjacent, with reference to information on properties of the at least one detected mark in each of the plurality of images, and generate a mark sequence including information on the properties of the recognized mark in the first and second images; and a spin measurement unit configured to measure a physical quantity related to spin of the ball with reference to the generated mark sequence.

In addition, there are further provided other methods, systems and non-transitory computer-readable recording media to implement the present invention.

According to the invention, a spin rate and a spin direction of a golf ball may be accurately measured using a time-sequential set of marks (i.e., a mark sequence) appearing over a plurality of golf ball images.

According to the invention, it is possible to compensate errors that may occur as an angle of view at which a camera photographing a moving golf ball views the golf ball varies with the movement of the golf ball, so that marks or a mark sequence appearing over a plurality of images in which the moving golf ball is photographed may be specified more accurately.

DETAILED DESCRIPTION

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

Figure 1:
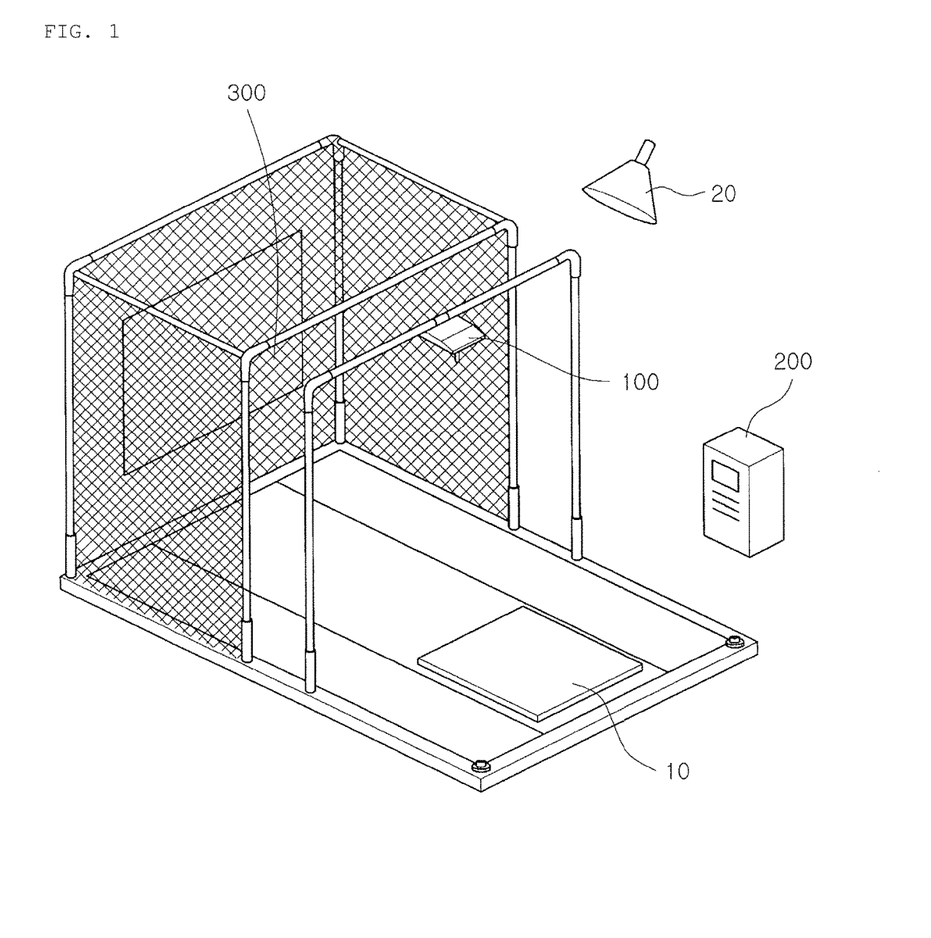
FIG. 1 is a schematic diagram of the overall configuration of a virtual golf system according to one embodiment of the invention.

FIG. 1 is a schematic diagram of the overall configuration of a virtual golf system according to one embodiment of the invention.

As shown in FIG. 1, the virtual golf system may be configured to comprise a shot unit 10, an illumination device 20, a photographing device 100, a simulator 200, and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the illumination device 20 according to one embodiment of the invention may irradiate light artificially when a golfer plays virtual golf indoors or outdoors. As necessary, the illumination device 20 may be turned on and off, or the brightness thereof may be adjusted. Preferably, the illumination device 20 may be an infrared illumination device for preventing natural deterioration of the images of the golf ball caused by the flickering of the light.

Next, the photographing device 100 according to one embodiment of the invention may comprise at least one camera (e.g., a high-speed camera) (not shown) and function to acquire two or more images of the golf ball (e.g., images of the moving golf ball). As shown in FIG. 1, the photographing device 100 may be disposed in a location to look down at the moving golf ball, while it may be disposed in other locations.

According to one embodiment of the invention, an image of the golf ball may be considered to be better if a mark on the surface of the golf ball is clearly shown such that a shape or location of the mark may be better specified. For example, if the mark shown in a region corresponding to the ball in the image of the golf ball is clearer, the simulator 200 to be described below may more accurately identify a mark sequence, which is a time-sequential set of marks appearing over a plurality of golf ball images, and calculate a spin rate and a spin direction of the golf ball.

The detailed configuration of the photographing device 100 will be further described later with reference to FIG. 2.

Next, the simulator 200 according to one embodiment of the invention may function to detect at least one mark appearing in a region corresponding to a ball in each of a plurality of images in which the ball is photographed, wherein a physical quantity of the ball is to be measured; recognize a mark commonly detected over a first image and a second image that are temporally adjacent, with reference to information on properties of the at least one detected mark in each of the plurality of images, and generate a mark sequence including information on the properties of the recognized mark in the first and second images; and measure a physical quantity related to spin of the ball with reference to the generated mark sequence.

Further, the simulator 200 according to one embodiment of the invention may function to compensate, for each of the plurality of photographed images, the properties (location, direction, etc.) of the at least one mark detected in each of the plurality of images, with reference to a line of sight in which a camera photographing the ball views the ball.

Meanwhile, the simulator 200 according to one embodiment of the invention may communicate with the photographing device 100 and the display device 300, and may comprise a dedicated processor for virtual golf simulation. The dedicated processor may be provided with memory means and may have numerical operation and graphics processing capabilities.

The configuration of the simulator 200 will be further described later with reference to FIG. 3.

Lastly, the display device 300 according to one embodiment of the invention may function to display a result of the physical quantity measurement or virtual reality implementation of the simulator 200. The display device 300 may display images via display means and, for example, may be configured with a screen, which absorbs the impact of the hit golf ball and does not emit light directly, and a projector to output images on the screen.

Configuration of Photographing Device

Hereinafter, the internal configuration of the photographing device 100 according to one embodiment of the invention and the functions of the respective components thereof will be described.

Figure 2:
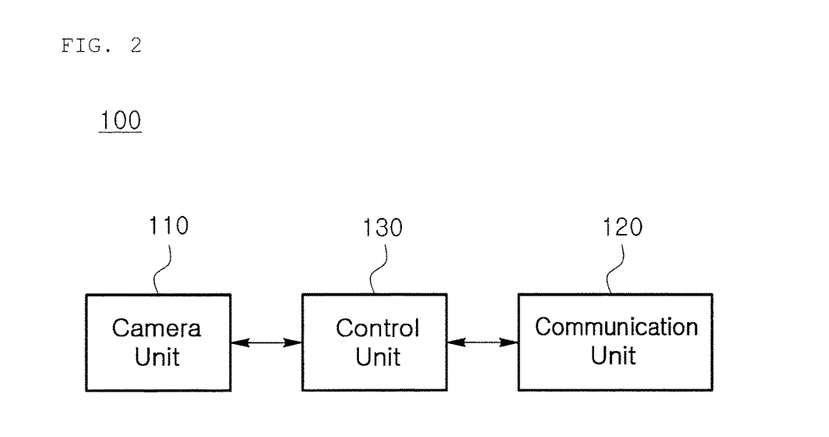
FIG. 2 is a detailed diagram of the internal configuration of a photographing device 100 according to one embodiment of the invention.

FIG. 2 is a detailed diagram of the internal configuration of the photographing device 100 according to one embodiment of the invention.

As shown in FIG. 2, the photographing device 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing device 100 in the form of operating systems, application program modules or other program modules, while they may be physically stored in a variety of commonly known storage devices. Further, the program modules may also be stored in a remote storage device that may communicate with the photographing device 100. Meanwhile, such program modules may include, but not limited to, routines, subroutines, programs, objects, components, data structures and the like for performing specific tasks or executing specific abstract data types as will be described below in accordance with the present invention.

First, the camera unit 110 according to one embodiment of the invention may comprise a camera that may optically acquire a plurality of images. For example, the camera unit 110 according to one embodiment of the invention may comprise a high-speed or ultrahigh-speed camera capable of photographing tens of frames of images per second. According to one embodiment of the invention, the camera of the camera unit 110 may photograph and acquire some images when a moving golf ball exists or not.

Next, the communication unit 120 according to one embodiment of the invention may function to mediate data transmission/reception between the control unit 130 and the simulator 200, as necessary. According to one embodiment of the invention, although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 according to one embodiment of the invention may function to control data flow among the camera unit 110 and the communication unit 120. That is, the control unit 130 according to the invention may control inbound/outbound data flow of the photographing device 100 or data flow among the respective components of the photographing device 100, such that the camera unit 110 and the communication unit 120 may carry out their particular functions, respectively.

Configuration of Simulator

Hereinafter, the internal configuration of the simulator 200 according to one embodiment of the invention and the functions of the respective components thereof will be described.

Figure 3:
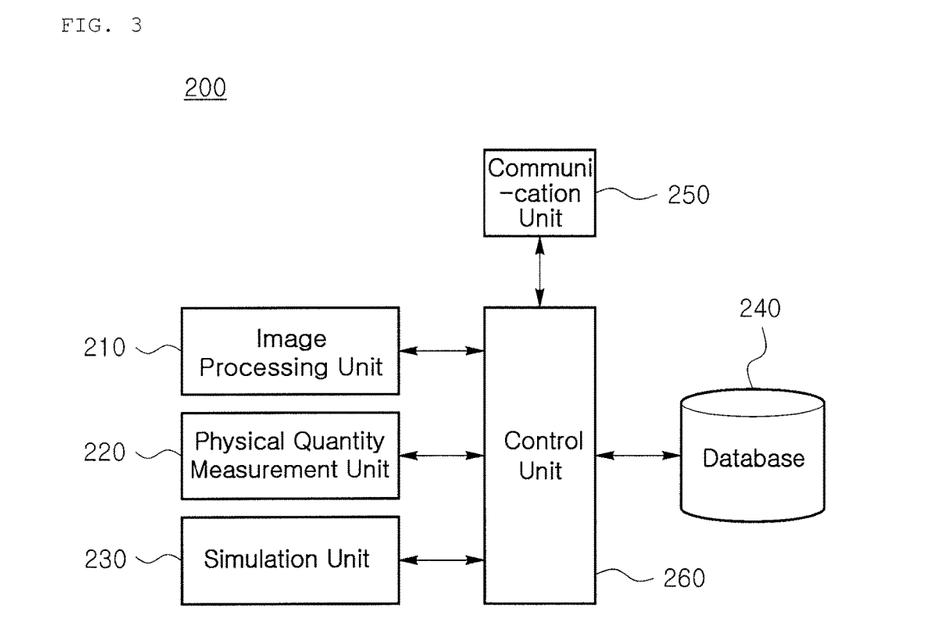
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise an image processing unit 210, a physical quantity measurement unit 220, a simulation unit 230, a database 240, a communication unit 250, and a control unit 260. Further, according to one embodiment of the invention, the image processing unit 210 may comprise an image acquisition unit (not shown) and an image compensation unit (not shown), and the physical quantity measurement unit 220 may comprise an angle-of-view compensation unit (not shown), a mark sequence management unit (not shown), and a spin measurement unit (not shown). According to one embodiment of the invention, at least some of the image processing unit 210, the physical quantity measurement unit 220, the simulation unit 230, the database 240, the communication unit 250, and the control unit 260 may be program modules to communicate with the photographing device 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

Meanwhile, although the simulator 200 has been described as above, the above description is illustrative and it will be apparent to those skilled in the art that all or a part of the functions or components required for the simulator 200 may be implemented or included in the photographing device 100, as necessary.

Brightness Compensation

First, according to one embodiment of the invention, the image processing unit 210 (specifically, the image acquisition unit) may function to acquire from the photographing device 100 a plurality of images in which a ball whose physical quantity is to be measured is photographed.

Figure 4A:
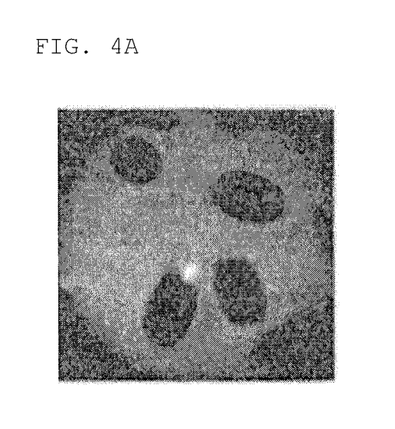
FIGS. 4A and 4B illustratively show golf ball images actually photographed according to one embodiment of the invention.
Figure 4B:
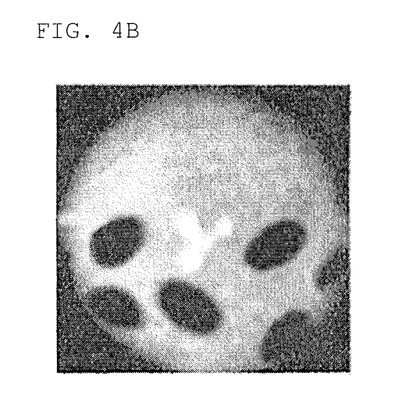

FIGS. 4A and 4B illustratively show golf ball images actually photographed according to one embodiment of the invention.

Referring to FIGS. 4A and 4B, brightness distribution of a region corresponding to a ball in a plurality of images may vary from image to image, due to various environmental factors such as the location of illumination, the irradiation direction or intensity of light, the location, specification, or setting of a camera, and the position or color of the ball. For example, the brightness of the region corresponding to the ball may be generally dark (see FIG. 4A), and the brightness of the central part of the region corresponding to the ball may be excessively brighter than the other parts thereof (see FIG. 4B).

First, according to one embodiment of the invention, the image processing unit 210 (specifically, the image compensation unit) may function to calculate photographed brightness distribution of a region corresponding to a ball in each of a plurality of images in which the ball is photographed, wherein a physical quantity of the ball is to be measured.

Specifically, the image compensation unit according to one embodiment of the invention may specify a region corresponding to the ball in each of the plurality of images by calculating a center point, a maximum brightness point, a radius or the like of the region corresponding to the ball in each of the images. Further, the image compensation unit according to one embodiment of the invention may calculate brightness distribution of the region corresponding to the ball in each of the plurality of images, with respect to a predetermined point (e.g., a center point, a maximum brightness point, etc.) in the region corresponding to the ball.

More specifically, the image compensation unit according to one embodiment of the invention may calculate the brightness distribution of the region corresponding to the ball in each of the plurality of images using a stochastic or statistical model such as a linear regression model and a non-parametric model.

For example, a relationship between a distance from a maximum brightness point to an arbitrary point in the region corresponding to the ball in each of the plurality of images and brightness of the arbitrary point may be derived on the basis of a linear regression model. As another example, brightness of an arbitrary point in the region corresponding to the ball in each of the plurality of images may be calculated on the basis of a non-parametric model such as a blurring filter, a low pass filter, and a Gaussian filter.

Further, according to one embodiment of the invention, the image processing unit 210 (specifically, the image compensation unit) may function to compensate the photographed brightness distribution of the region corresponding to the ball in at least one of the plurality of images, with reference to reference brightness distribution. Here, according to one embodiment of the invention, the reference brightness distribution is predetermined brightness distribution suitable for detecting and recognizing a mark on the surface of the ball, and may be stored in the database 240.

Specifically, the image compensation unit according to one embodiment of the invention may compensate the photographed brightness distribution of the region corresponding to the ball in the image to be compensated, such that uniformity of the photographed brightness distribution of the region corresponding to the ball in the image is equal to or greater than a predetermined level.

More specifically, the image compensation unit according to one embodiment of the invention may compare first photographed brightness distribution of a region corresponding to the ball in a first image and reference brightness distribution to calculate a compensation model for compensating the first photographed brightness distribution, and may compensate the first photographed brightness distribution with reference to the calculated compensation model.

For example, the compensation model according to one embodiment of the invention may be expressed by the equations (1) and (2) below.

$$E(P) = c*B(P) + d \quad (1)$$

$$F(P) = B(P) + E(P) \text{ or } F(P) = B(P)*E(P) \quad (2)$$

In the equations (1) and (2), B(P) denotes brightness of an arbitrary point P; E(P) denotes a compensation model for the brightness of the point P; c and d denote compensation coefficients for specifying the compensation model E(P); and F(P) denotes the brightness of the point P compensated (i.e., uniformized) by the compensation model E(P).

Figure 5A:
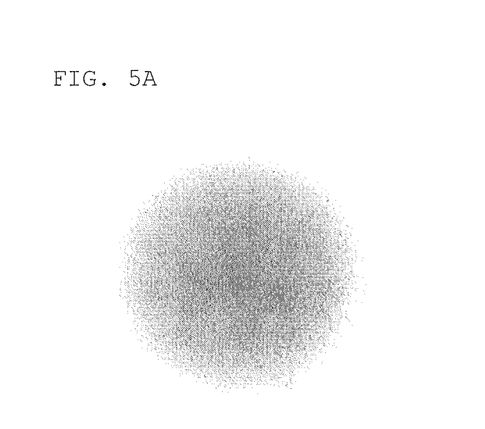
FIGS. 5A and 5B visually show compensation models that may be applied to golf ball images according to one embodiment of the invention.
Figure 5B:
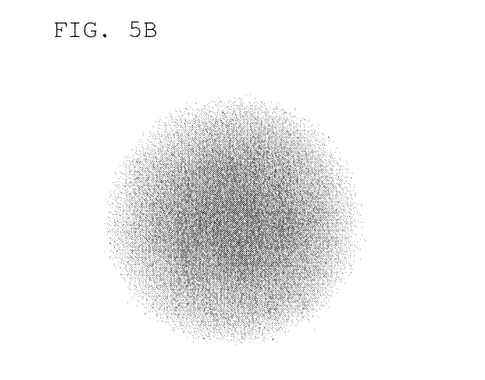

FIGS. 5A and 5B visually show compensation models that may be applied to golf ball images according to one embodiment of the invention. FIGS. 5A and 5B visualize the compensation models that may be applied to the images of FIGS. 4A and 4B, respectively.

Figure 6A:
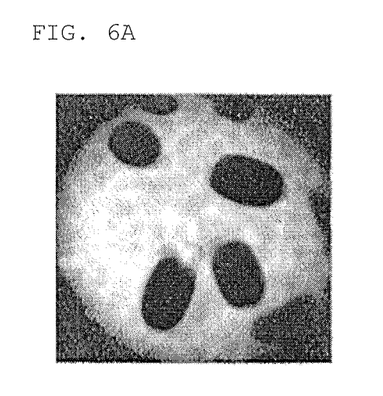
FIGS. 6A and 6B illustratively show golf ball images whose brightness has been compensated according to one embodiment of the invention.
Figure 6B:
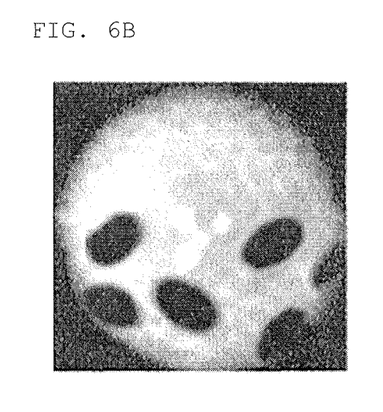

FIGS. 6A and 6B illustratively show golf ball images whose brightness has been compensated according to one embodiment of the invention.

Referring to FIGS. 6A and 6B, it can be seen that the brightness distribution of the region corresponding to the ball in each of the golf ball images shown in FIGS. 4A and 4B has been made uniform.

As described above, according to one embodiment of the invention, brightness distribution of regions corresponding to a ball may be compensated (i.e., made uniform) over a plurality of golf ball images as well as within each golf ball image, so that a mark commonly appearing over the plurality of images may be detected and recognized more accurately by reducing the potential for errors due to brightness differences.

However, it is noted that the method for compensating brightness distribution of golf ball images according to the invention is not necessarily limited to the above-described algorithm, but may be changed without limitation as long as the objects of the invention can be achieved.

Ball Spin Measurement Using Mark Sequence

Meanwhile, according to one embodiment of the invention, the physical quantity measurement unit 220 may function to analyze a mark sequence appearing in the plurality of golf ball images (more specifically, the plurality of temporally adjacent golf ball images) which have been compensated (i.e., whose bright distribution has been made uniform) as above, thereby measuring a spin rate and a spin direction of the golf ball. Specifically, the physical quantity measurement unit 220 according to one embodiment of the invention may estimate the spin rate and spin direction of the golf ball with reference to a moving speed and a moving direction of the mark on the surface of the golf ball observed from the above mark sequence.

Further, the physical quantity measurement unit 220 according to one embodiment of the invention may also function to calculate a movement trajectory, a moving speed, or a height of the golf ball.

Specifically, the physical quantity measurement unit 220 (specifically, the mark sequence management unit) according to one embodiment of the invention may function to detect at least one mark appearing in a region corresponding to a ball in each of a plurality of images in which the ball is photographed, wherein a physical quantity of the ball is to be measured. Further, the physical quantity measurement unit 220 according to one embodiment of the invention may function to specify properties of the at least one detected mark in each of the plurality of images. Here, the properties may include a location, direction, size, shape and the like of the at least one detected mark in each of the plurality of images.

FIGS. 7A to 7E illustratively show appearances of marks appearing over a plurality of golf ball images actually photographed according to one embodiment of the invention.

Referring to FIGS. 7A to 7E, a plurality of marks 710a to 770e printed on the surface of a ball 701 may be detected from each of five images that are photographed temporally adjacently.

Meanwhile, the physical quantity measurement unit 220 (specifically, the mark sequence management unit) according to one embodiment of the invention may recognize a mark commonly detected over two or more images that are temporally adjacent, with reference to information on the properties of the at least one detected mark in each of the plurality of images, and generate a mark sequence including information on the properties of the recognized mark in each of the two or more images.

Specifically, when there are marks having properties (e.g., a location, direction, size, shape, etc.) that are similar at or above a predetermined level (i.e., marks matched to each other) among at least one mark detected in a first image and at least one mark detected in a second image temporally adjacent to the first image, the mark sequence management unit according to one embodiment of the invention may recognize the matched marks as a mark commonly detected over the first and second images, and generate a mark sequence including information on the properties of the recognized mark in the first and second images.

More specifically, the mark sequence management unit according to one embodiment of the invention may determine a candidate region where a specific mark detected in a first image temporally adjacent to a second image is likely to be detected in the second image (e.g., a region around the location where the specific mark is detected in the first image), with reference to a time interval (e.g., frames per second (fps)) between the points of time at which the plurality of images are respectively photographed, a rate or direction of spin of the ball that may commonly occur in sports such as golf, a spin rate or spin direction of the ball that has been measured so far, and the like, and may recognize a mark whose shape is most similar to that of the specific mark, among at least one mark detected in the determined candidate region in the second image, as a mark matched to the specific mark.

Figure 7A:
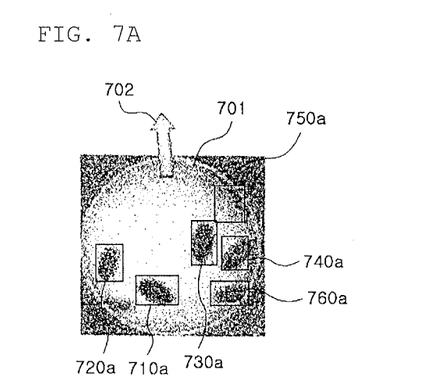
FIGS. 7A, 7B, 7C, 7D, and 7E illustratively show appearances of marks appearing over a plurality of golf ball images actually photographed according to one embodiment of the invention.
Figure 7B:
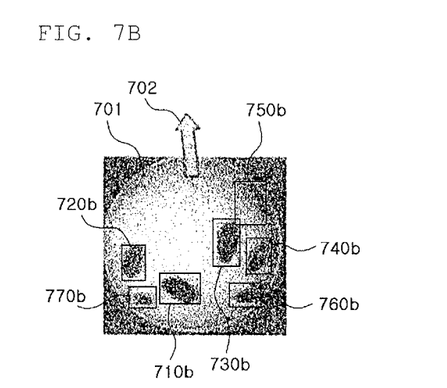

For example, referring to FIGS. 7A and 7B, which are two images photographed temporally adjacently, when a first mark 710a appearing in the temporally preceding image of FIG. 7A and a first mark 710b appearing in the temporally following image of FIG. 7B are similar at or above a predetermined level in terms of their location, direction, size and shape, the mark sequence management unit according to one embodiment of the invention may recognize that the first mark 710a, 710b is detected in both the images of FIGS. 7A and 7B, and generate a mark sequence for the first mark 710a, 710b, which includes information on the properties of the first mark 710a, 710b in each of the images of FIGS. 7A and 7B as sequence data.

Further, when it is determined with reference to properties such as a location, direction, size, and shape that there exists a mark not detected in a first image but detected in a second image temporally adjacent to the first image, the mark sequence management unit according to one embodiment of the invention may recognize the mark as a mark newly appearing after photographing the second image, and generate a new mark sequence starting from information on the properties of the recognized mark in the second image.

For example, referring to FIGS. 7A and 7B, which are two images photographed temporally adjacently, when there exists a seventh mark 770b not appearing in the temporally preceding image of FIG. 7A but appearing in the temporally following image of FIG. 7B, the mark sequence management unit according to one embodiment of the invention may recognize that the seventh mark 770b is first detected in the image of FIG. 7B, and generate a mark sequence for the seventh mark 770b, which includes information on the properties of the seventh mark 770b in the image of FIG. 7B as starting data.

Further, when it is determined with reference to properties such as a location, direction, size, and shape that there exists a mark detected in a first image but not detected in a second image temporally adjacent to the first image, the mark sequence management unit according to one embodiment of the invention may recognize the mark as a mark no longer appearing after photographing the first image, and finish an existing mark sequence generated for the recognized mark such that it ends with information on the properties of the mark in the first image.

Figure 7C:
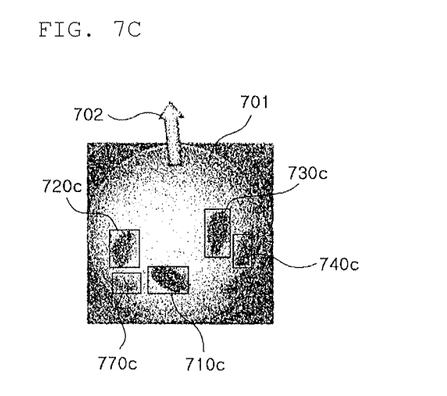
Figure 7D:
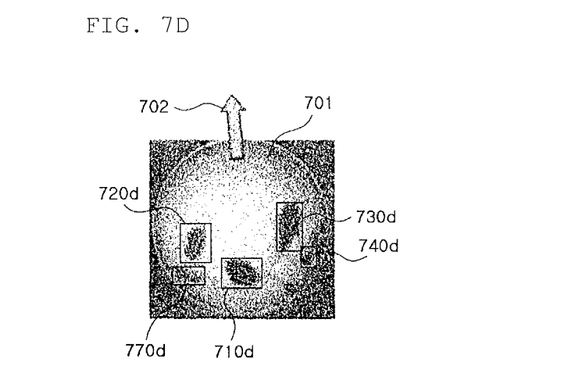
Figure 7E:
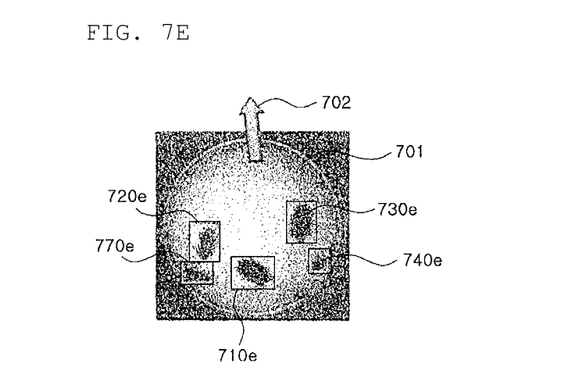

For example, referring to FIGS. 7A, 7B and 7C, which are images photographed temporally adjacently, when there exists a fifth mark 750a, 750b appearing in the temporally preceding images of FIGS. 7A and 7B but not appearing in the temporally following image of FIG. 7C, the mark sequence management unit according to one embodiment of the invention may recognize that the fifth mark 750a, 750b is finally detected in the image of FIG. 7B, and finish an existing mark sequence generated for the fifth mark 750a, 750b such that its ending data may be information on the properties of the fifth mark 750a, 750b in the image of FIG. 7B.

Meanwhile, according to one embodiment of the invention, the spin measurement unit may function to measure a spin rate and a spin direction of a photographed ball, with reference to information on properties of at least one mark in each of a plurality of images, which is included in a mark sequence generated for the at least one mark.

Specifically, the spin measurement unit according to one embodiment of the invention may derive, from information included in a mark sequence for at least one mark, a distance d between the locations of marks respectively detected in two temporally adjacent images, and determine a spin rate (i.e., spin angular velocity) ($\omega = 360d/2\pi r \Delta t$) of the ball to be measured, with reference to the derived distance and a time interval $\Delta t$ between the points of time at which the two temporally adjacent images are respectively photographed. Here, according to one embodiment of the invention, the locations of the marks and the distance between the marks as mentioned above may be specified with respect to a spherical coordinate system defining the surface of the ball.

Further, the spin measurement unit according to one embodiment of the invention may derive, from information included in a mark sequence for at least one mark, a path in which the location of a mark moves (i.e., rotates about a rotation axis) over two or more temporally consecutive images, and determine a spin axis of the ball to be measured with reference to the derived direction.

For example, referring to FIGS. 7A to 7E, a spin rate of the ball 701 may be determined on the basis of a distance between the location of the first mark 710a detected in FIG. 7A and that of the first mark 710b detected in FIG. 7B, and a spin axis (i.e., spin direction) 702 of the ball 701 may be determined on the basis of a moving path of the locations of the first mark 710a to 710e detected over FIG. 7A to 7E.

Compensating Angle-of-View of Camera

Meanwhile, the physical quantity measurement unit 220 (specifically, the angle-of-view compensation unit) according to one embodiment of the invention may function to compensate, for each of a plurality of images photographed by a camera, the properties (e.g., location, direction, etc.) of at least one detected mark in each of the plurality of images, with reference to an angle of view at which the camera views a photographed ball.

Figure 8:
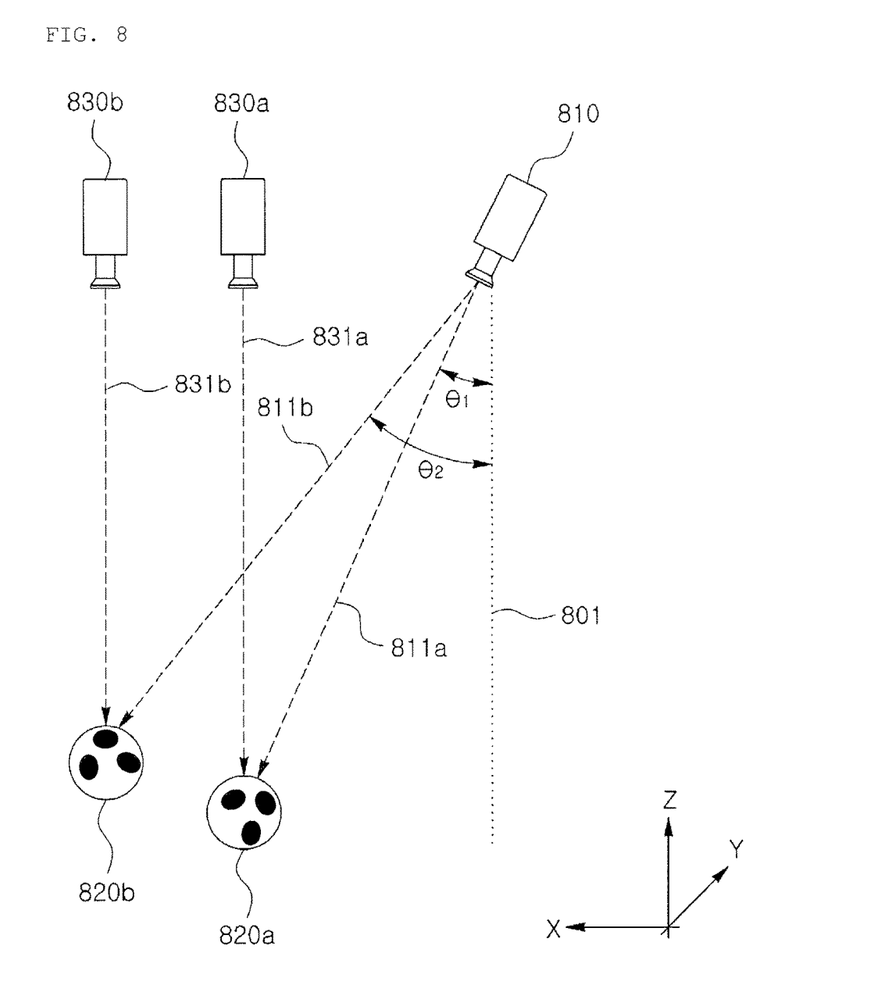
FIG. 8 conceptually shows how to compensate errors that may occur as an angle of view of a camera photographing a moving golf ball varies with the movement of the golf ball according to one embodiment of the invention.

FIG. 8 conceptually shows how to compensate errors that may occur as an angle of view of a camera photographing a moving golf ball varies with the movement of the golf ball according to one embodiment of the invention.

In the embodiment of FIG. 8, a camera 810 fixedly installed at a specific location in a three-dimensional real space may photograph a ball 820a, 820b several times for a predetermined time period, which is moving in the positive (+) direction of the X-axis with respect to the camera 810, thereby generating a plurality of temporally adjacent images for the ball 820a, 820b. In this case, according to one embodiment of the invention, a direction (i.e., direction of view) 811a, 811b in which the camera 810 views the photographed ball 820a, 820b may be changed as the ball 820a, 820b moves in a predetermined moving direction. Thus, each of the plurality of images may show the appearance change of the ball 701 caused not only by the movement or spin of the ball 820a, 820b itself, but also by the change in the angle or direction of view in which the camera 810 views the ball 820a, 820b. This may cause substantial errors in measuring spin of the ball on the basis of the appearance of the ball appearing in each of the plurality of images (specifically, the appearance of at least one mark detected in each of the plurality of images).

In this regard, the angle-of-view compensation unit according to one embodiment of the invention may perform compensation for eliminating errors caused by the change in the angle or direction of view in which the camera 810 views the ball 820a, 820b.

First, referring to FIG. 8, for an image generated by the camera 810 photographing the ball 820a present at a first location, the angle-of-view compensation unit according to one embodiment of the invention may calculate an angle $\theta_1$ between a real line-of-sight vector 811a, which specifies a line of sight in which the camera 810 views the ball 820a, and a virtual line-of-sight vector 831a, which is parallel to a reference axis 801 (i.e., the Z-axis) defining the direction of gravity and specifies a line of sight in which a virtual camera 830a located on a virtual straight line passing through the ball 820a views the ball 820a.

Next, referring to FIG. 8, the angle-of-view compensation unit according to one embodiment of the invention may compensate errors due to the difference in the line of sight of the camera, by rotating the coordinates of at least one mark, which is detected in the image generated by the camera 810 photographing the ball 820a present at the first location, by the calculated angle $\theta_1$ around a predetermined compensation reference axis.

Here, according to one embodiment of the invention, the coordinates of the at least one mark to be compensated may be coordinates on a spherical coordinate system defining the surface of the ball. Further, according to one embodiment of the invention, the rotation of the coordinates of the at least one mark to be compensated may be performed according to various rotation transformation techniques such as Rodrigues rotation and Euler rotation.

More specifically, the angle-of-view compensation unit according to one embodiment of the invention may calculate a vector defining an axis serving as a center of rotation for the above compensation (i.e., a compensation reference axis), with reference to the real line-of-sight vector 811a and the virtual line-of-sight vector 831a. For example, assuming that the real line-of-sight vector 811a is Vs and the virtual line-of-sight vector 831a is Us, a compensation reference axis vector a may be calculated as a result of a cross product of Vs and Us as in the equation (3) below.

$$a = Vs \times Us \qquad (3)$$

Thus, the angle-of-view compensation unit according to one embodiment of the invention may compensate errors due to the difference between the angles or directions of view of the real camera 810 and the virtual camera 830a, by rotating the coordinates of at least one mark, which is detected in the image generated by the camera 810 photographing the ball 820a present at the first location, by the calculated angle around a compensation reference axis according to the equation (3).

Referring further to FIG. 8, it may be assumed that the location of the ball to be measured moves from the first location of the ball 820a to the second location of the ball 820b as the ball moves further in the positive (+) direction of the X-axis. In this case, the angle-of-view compensation unit according to one embodiment of the invention may calculate an angle $\theta_2$ between a real line-of-sight vector 811b and a virtual line-of-sight vector 831b for the ball 820b present at the second location, and calculate a vector defining a compensation reference axis on the basis of the real line-of-sight vector 811b and the virtual line-of-sight vector 831b. Further, the angle-of-view compensation unit according to one embodiment of the invention may compensate errors due to the difference between the angles of view of the real camera 810 and the virtual camera 830b, by rotating the coordinates of at least one mark, which is detected in an image generated by the camera 810 photographing the ball 820b present at the second location, by the calculated angle $\theta_2$ around the calculated compensation reference axis.

Next, the simulation unit 230 according to one embodiment of the invention may implement movement of the golf ball (e.g., a spin rate, a spin direction, a moving speed, a moving direction, an angle of departure, etc.) in virtual reality, on the basis of a variety of information on the physical quantities of the golf ball measured as above. Further, the simulation unit 230 according to one embodiment of the invention may transmit to the display device 300 a control signal reflecting the movement of the golf ball in a graphical object or containing a video signal, so that the movement of the golf ball may be realistically displayed in the display device 300.

Meanwhile, the simulation unit 230 according to one embodiment of the invention may cause images actually photographed by the camera unit 110 to be displayed directly on a user screen. Specifically, the simulation unit 230 according to one embodiment of the invention may display a plurality of images on the user screen, which have been actually photographed by the camera unit 110 and subjected to the above brightness compensation, mark recognition, angle-of-view compensation and the like, and the plurality of displayed images may include graphical elements (e.g., a guide line indicating a mark sequence, a rotation axis, or the like) to facilitate the user's understanding.

Therefore, according to the invention, the user's confidence in a physical quantity related to spin of a golf ball measured by virtual golf simulation may be enhanced, and the user's immersion in a virtual golf environment may be increased.

Next, the database 240 according to one embodiment of the invention may store information on the photographed images of the golf ball, the images in which brightness distribution of the golf ball has been compensated, the mark sequence, the angle of view, the compensation reference axis, the calculated physical quantities and the like, or information required for the simulation (e.g., data required to implement the virtual reality). Although FIG. 3 shows that the database 240 is incorporated in the simulator 200, the database 240 may be configured separately from the simulator 200 as needed by those skilled in the art to implement the invention. Meanwhile, the database 240 according to the invention encompasses a computer-readable recording medium, and may refer not only to a database in a narrow sense but also to a database in a broad sense including file system-based data records and the like. The database 240 according to the invention may be even a collection of simple logs if one can search and retrieve data from the collection.

Next, the communication unit 250 according to one embodiment of the invention may function to enable data transmission/reception to/from the simulator 200. Although there is no particular limitation on the communication modality that may be employed by the communication unit 250, wired communication such as wired LAN communication and cable communication, or wireless communication such as wireless LAN communication, infrared communication, RF communication, and Bluetooth communication may preferably be employed.

Lastly, the control unit 260 according to one embodiment of the invention may function to control data flow among the image processing unit 210, the physical quantity measurement unit 220, the simulation unit 230, the database 240, and the communication unit 250. That is, the control unit 260 according to the invention may control inbound/outbound data flow of the simulator 200 or data flow among the respective components of the simulator 200, such that the image processing unit 210, the physical quantity measurement unit 220, the simulation unit 230, the database 240, and the communication unit 250 may carry out their particular functions, respectively.

Although it has been mainly described above that the virtual sport system of the present invention is a virtual golf system, it will be apparent to those skilled in the art that the technical principle and configuration of the invention may be applied to all kinds of virtual sport systems (e.g., virtual baseball systems or virtual football systems) requiring simulation of the movement of a ball.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for measuring ball spin, comprising the steps of:
    detecting at least one mark appearing in a region corresponding to a ball in each of a plurality of images in which the ball is photographed, wherein a physical quantity of the ball is to be measured;
    recognizing a mark commonly detected over a first image and a second image that are temporally adjacent, with reference to information on properties of the at least one detected mark in each of the plurality of images, and generating a mark sequence including information on the properties of the recognized mark in the first and second images; and
    measuring a physical quantity related to spin of the ball with reference to the generated mark sequence,
    wherein the detecting step comprises:
    compensating, for each of the plurality of images, the properties of the at least one mark in each of the plurality of images, with reference to a line of sight in which a camera photographing the ball views the ball, and
    wherein the compensating step comprises:
    calculating, for each of the plurality of images, an angle between a real line-of-sight vector, which specifies the line of sight in which the camera views the ball, and a virtual line-of-sight vector, which is parallel to a reference axis defining a direction of gravity and specifies a line of sight in which a virtual camera located on a virtual straight line passing through the ball views the ball;
    calculating, for each of the plurality of images, a compensation reference axis vector with reference to the real line-of-sight vector and the virtual line-of-sight vector; and
    rotating, for each of the plurality of images, coordinates of the at least one mark by the calculated angle around the compensation reference axis vector, on a spherical coordinate system defining a surface of the ball.

2. The method of claim 1, wherein the properties include at least one of a location, size, direction, and shape.

3. The method of claim 2, wherein the properties are specified with respect to a spherical coordinate system defining a surface of the ball.

4. The method of claim 1, wherein in the recognizing step, a first mark appearing in the first image and a second mark appearing in the second image are recognized as a mark commonly detected over the first and second images, when a relationship between the properties of the first mark in the first image and the properties of the second mark in the second image satisfies a predetermined condition.

5. The method of claim 4, wherein in the recognizing step, whether the relationship satisfies the predetermined condition is determined with reference to information on at least one of a time interval between points of time at which the first and second images are respectively photographed, a normal spin rate or spin direction of the ball, and a previously measured spin rate or spin direction of the ball.

6. The method of claim 4, wherein in the recognizing step, the first and second marks are recognized as the mark commonly detected over the first and second images, when a location and a shape of the first mark in the first image and a location and a shape of the second mark in the second image are similar at or above a predetermined level.

7. The method of claim 1, wherein the physical quantity related to spin of the ball includes a spin rate and a spin direction of the ball.

8. The method of claim 1, wherein in the measuring step, a spin rate of the ball is determined with reference to a distance between a location of the recognized mark in the first image and a location of the recognized mark in the second image, and a time interval between points of time at which the first and second images are respectively photographed, and a spin direction of the ball is determined with reference to a moving path between the location of the recognized mark in the first image and the location of the recognized mark in the second image.

9. A system for measuring ball spin, comprising:
    a non-transitory computer-readable recording medium; and
    program modules stored in the non-transitory computer-readable medium, the program modules comprising:
    a mark sequence management unit configured to:
    detect at least one mark appearing in a region corresponding to a ball in each of a plurality of images in which the ball is photographed, wherein a physical quantity of the ball is to be measured, and
    recognize a mark commonly detected over a first image and a second image that are temporally adjacent, with reference to information on properties of the at least one detected mark in each of the plurality of images, and generate a mark sequence including information on the properties of the recognized mark in the first and second images;

a spin measurement unit configured to measure a physical quantity related to spin of the ball with reference to the generated mark sequence; and an angle-of-view compensation unit configured to compensate, for each of the plurality of images, the properties of the at least one mark in each of the plurality of images, with reference to a line of sight in which a camera photographing the ball views the ball, wherein the angle-of-view compensation unit is configured to:

calculate, for each of the plurality of images, an angle between a real line-of-sight vector, which specifies the line of sight in which the camera views the ball, and a virtual line-of-sight vector, which is parallel to a reference axis defining a direction of gravity and specifies a line of sight in which a virtual camera located on a virtual straight line passing through the ball views the ball;

calculate, for each of the plurality of images, a compensation reference axis vector with reference to the real line-of-sight vector and the virtual line-of-sight vector; and rotate, for each of the plurality of images, coordinates of the at least one mark by the calculated angle around the compensation reference axis vector, on a spherical coordinate system defining a surface of the ball.

10. The system of claim 9, wherein the properties include at least one of a location, size, direction, and shape.

11. The system of claim 10, wherein the properties are specified with respect to a spherical coordinate system defining a surface of the ball.

12. The system of claim 9, wherein the mark sequence management unit is configured to recognize a first mark appearing in the first image and a second mark appearing in the second image as a mark commonly detected over the first and second images, when a relationship between the properties of the first mark in the first image and the properties of the second mark in the second image satisfies a predetermined condition.

13. The system of claim 12, wherein the mark sequence management unit is configured to determine whether the relationship satisfies the predetermined condition, with reference to information on at least one of a time interval between points of time at which the first and second images are respectively photographed, a normal spin rate or spin direction of the ball, and a previously measured spin rate or spin direction of the ball.

14. The system of claim 12, wherein the mark sequence management unit is configured to recognize the first and second marks as the mark commonly detected over the first and second images, when a location and a shape of the first mark in the first image and a location and a shape of the second mark in the second image are similar at or above a predetermined level.

15. The system of claim 9, wherein the physical quantity related to spin of the ball includes a spin rate and a spin direction of the ball.

16. The system of claim 9, wherein the spin measurement unit is configured to determine a spin rate of the ball with reference to a distance between a location of the recognized mark in the first image and a location of the recognized mark in the second image, and a time interval between points of time at which the first and second images are respectively photographed, and determine a spin direction of the ball with reference to a moving path between the location of the recognized mark in the first image and the location of the recognized mark in the second image.

* * * * *